I. CHAMBERS.
DISK ATTACHMENT FOR PLOWS.
APPLICATION FILED AUG. 28, 1916.
1,218,054.
Patented Mar. 6, 1917.
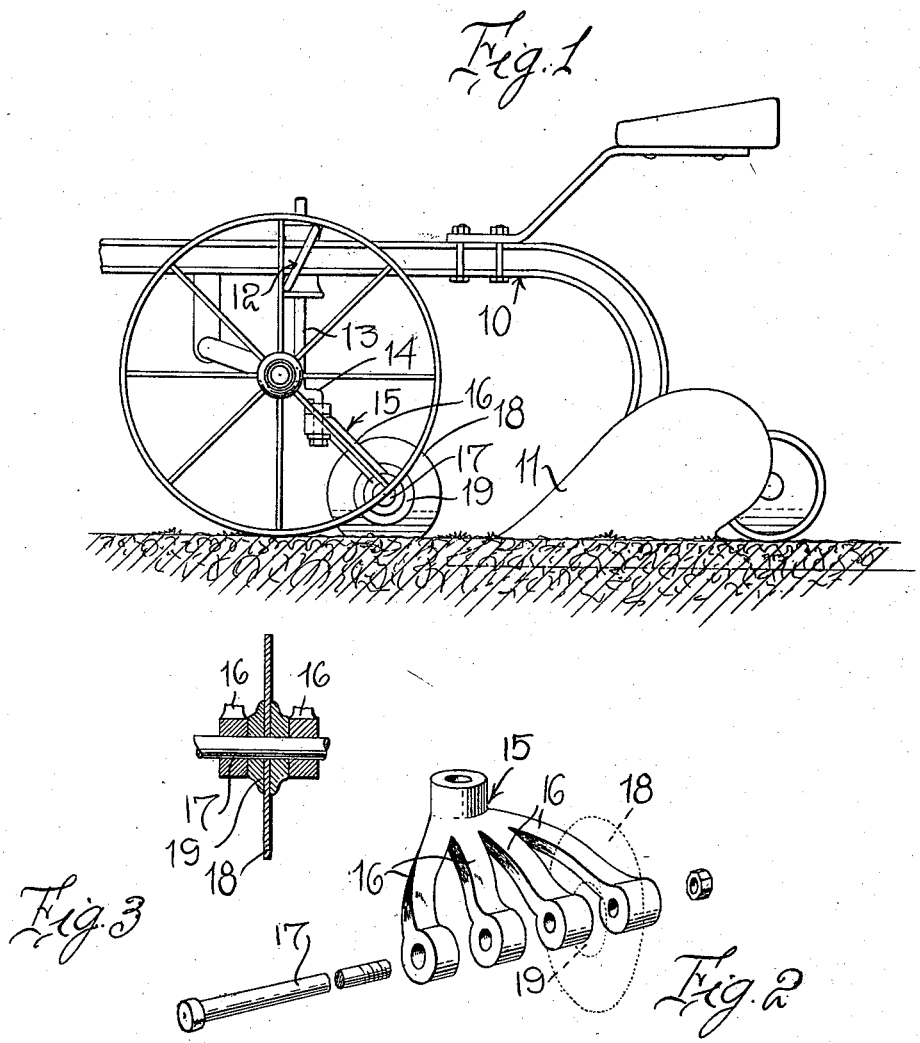
Inventor
IVAN CHAMBERS
By Watson E. Coleman
Attorney

UNITED STATES PATENT OFFICE.

IVAN CHAMBERS, OF SPENCER, INDIANA.

DISK ATTACHMENT FOR PLOWS.

1,218,054.  Specification of Letters Patent.  Patented Mar. 6, 1917.

Application filed August 28, 1916. Serial No. 117,309.

*To all whom it may concern:*

Be it known that I, IVAN CHAMBERS, a citizen of the United States, residing at Spencer, in the county of Owen and State of Indiana, have invented certain new and useful Improvements in Disk Attachments for Plows, of which the following is a specification, reference being had to the accompanying drawings.

This invention relates to plows and particularly to plow colters.

The general object of my invention is the provision of a colter attachment adapted to be attached to the plow beam in front of the plow share for the purpose of cutting the ground in front of the plow share on a plurality of lines so as to make the plow operate much easier and break up the ground more thoroughly.

A further object of the invention is to provide an attachment of this character adapted to support either one or a plurality of cutting disks or colters.

Other objects will appear in the course of the following description.

My invention is illustrated in the accompanying drawings, in which—

Figure 1 is a side elevation of a plow with my attachment applied thereto;

Fig. 2 is a perspective view of the yoke or frame 15;

Fig. 3 is a sectional view through one of the colters and through the arms of the frame 15.

Referring to these drawings 10 designates the beam of a plow of any ordinary or suitable construction and 11 the share thereof. This plow is illustrated as an ordinary sulky plow but I do not wish to be limited to this as it is obvious that my invention might be applied to other forms of plow. Clamped upon the plow beam by clamps 12 is a vertically disposed shaft 13 which is cranked at its lower end as at 14. Operatively engaged with this cranked lower end is a colter supporting frame 15 which is formed with a body into which the end of the shaft 13 passes and with a plurality of rearwardly and downwardly directed arms 16. These arms at their ends are perforated for the passage of a transverse shaft 17 which may be in the form of a bolt and mounted upon this shaft are a plurality of cutting disks or colters designated 18, each of these disks being provided with a hub 19 of sufficient length to fit loosely between adjacent arms so that the cutting disk or colter is held from lateral movement. As before stated, the shaft 17 may be in the form of a bolt so that the shaft may be readily removed to provide for a removal of one or more of the colters or the substitution of new colters for the ones removed. It is of course to be understood that the shaft 13 is vertically adjustable in the clamps 12 so as to increase or decrease the depth of cut.

The attachment above described provides a very simple means for cutting up the soil in front of the plow share so as to make the plow work easier and more effectively. The device is very simple, can be readily put in place, and has been found most effective in practice.

What I claim is:

As a new article of manufacture, a colter supporting frame consisting of a tubular body and a plurality of pairs of rigid and substantially straight arms integrally connected with an end portion of the body and extending from the body in the same general direction and on an incline away from the body, the free ends of said rigid arms being spaced one from the other a predetermined distance and provided with alining openings, and a removable shaft inserted through the alined openings in the free extremities of the arms, said shaft being adapted to rotatably support a colter between each pair of arms.

In testimony whereof I hereunto affix my signature in the presence of two witnesses.

IVAN CHAMBERS.

Witnesses:
 RALPH R. BOYERS,
 JOHN H. SMITH.

Copies of this patent may be obtained for five cents each, by addressing the "Commissioner of Patents, Washington, D. C."